United States Patent
Numazaki et al.

(10) Patent No.: US 7,453,511 B2
(45) Date of Patent: Nov. 18, 2008

(54) APPARATUS AND METHOD FOR INPUTTING REFLECTED LIGHT IMAGE OF A TARGET OBJECT

(75) Inventors: Shunichi Numazaki, Yokohama (JP); Miwako Doi, Kawasaki (JP); Yoshiyuki Matsunaga, Kamakura (JP); Akira Morishita, Tokyo (JP); Naoko Umeki, Kawasaki (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1096 days.

(21) Appl. No.: 10/644,754

(22) Filed: Aug. 21, 2003

(65) Prior Publication Data

US 2004/0046737 A1 Mar. 11, 2004

Related U.S. Application Data

(62) Division of application No. 09/268,645, filed on Mar. 16, 1999, now Pat. No. 6,714,247.

(30) Foreign Application Priority Data

Mar. 17, 1998 (JP) ............... 10-066382

(51) Int. Cl.
H04N 5/225 (2006.01)
H04N 5/33 (2006.01)
H04N 5/222 (2006.01)

(52) U.S. Cl. .............. 348/342; 348/164; 348/361; 348/371

(58) Field of Classification Search ........... 345/158; 348/164, 370, 371, 342, 343, 344, 361, 340, 348/335, 262

See application file for complete search history.

(56) References Cited

U.S. PATENT DOCUMENTS

| 4,641,349 | A | | 2/1987 | Flom et al. |
| 4,879,592 | A | | 11/1989 | Ernest |
| 4,888,644 | A | | 12/1989 | Wilson |
| 4,967,276 | A | * | 10/1990 | Murakami et al. .......... 348/164 |
| 5,214,503 | A | | 5/1993 | Chiu et al. |
| 5,574,511 | A | * | 11/1996 | Yang et al. .................. 348/586 |
| 5,801,763 | A | | 9/1998 | Suzuki |
| 6,021,210 | A | | 2/2000 | Camus et al. |
| 6,057,909 | A | | 5/2000 | Yahav et al. |

(Continued)

FOREIGN PATENT DOCUMENTS

JP 56-130608 10/1981

(Continued)

*Primary Examiner*—Lin Ye
*Assistant Examiner*—Jason Whipkey
(74) *Attorney, Agent, or Firm*—Oblon, Spivak, McClelland, Maier & Neustadt, P.C.

(57) ABSTRACT

An area image sensor outputs the difference between charges received by light-receiving cells arranged in an array pattern. A system controller generates a timing signal for generating a pulse or modulation signal. A control signal generator generates a control signal for separately controlling the light-receiving timings of the light-receiving cells of the area image sensor on the basis of the timing signal from the system controller. A light emitting controller controls a light source to generate light, the intensity of which changes on the basis of the timing signal from the system controller. A reflected light image processor extracts a reflected image of an object from the difference outputted from the area image sensor.

5 Claims, 11 Drawing Sheets

U.S. PATENT DOCUMENTS

| | | | |
|---|---|---|---|
| 6,100,517 A * | 8/2000 | Yahav et al. | 348/138 |
| 6,144,366 A | 11/2000 | Numazaki et al. | |
| 6,256,067 B1 | 7/2001 | Yamada | |
| 6,292,169 B1 | 9/2001 | Numazaki et al. | |
| 6,661,453 B1 * | 12/2003 | Numazaki et al. | 348/371 |
| 6,697,116 B1 * | 2/2004 | Kurokawa et al. | 348/371 |
| 6,714,247 B1 * | 3/2004 | Numazaki et al. | 348/370 |

FOREIGN PATENT DOCUMENTS

| | | |
|---|---|---|
| JP | 57-133411 | 8/1982 |
| JP | 5-157525 | 6/1993 |
| JP | 6-164924 | 6/1994 |
| JP | 9-91079 | 4/1997 |
| JP | 62-192714 | 8/1997 |

* cited by examiner

| G1 | R1 | G5 | R | G | R | G | R |
|----|----|----|----|----|----|----|----|
| B1 | G3 | B | G7 | B | G | B | G |
| G2 | R | G6 | R | G | R | G | R |
| B | G4 | B | G8 | B | G | B | G |
| G | R | G | R | G | R | G | R |
| B | G | B | G | B | G | B | G |
| G | R | G | R | G | R | G | R |
| B | G | B | G | B | G | B | G |

FIG. 9

| G1 | R | G | R | G | R | G | R |
|----|----|----|----|----|----|----|----|
| G2 | B | G | B | G | B | G | B |
| G | R | G | R | G | R | G | R |
| G | B | G | B | G | B | G | B |
| G | R | G | R | G | R | G | R |
| G | B | G | B | G | B | G | B |
| G | R | G | R | G | R | G | R |
| G | B | G | B | G | B | G | B |

FIG. 10

| G | R | G | R | G | R | G | R |
|----|----|----|----|----|----|----|----|
| B | G | B | G | B | G | B | G |
| H1 | H3 | H | H | H | H | H | H |
| H2 | H4 | H | H | H | H | H | H |
| G | R | G | R | G | R | G | R |
| B | G | B | G | B | G | B | G |
| H | H | H | H | H | H | H | H |
| H | H | H | H | H | H | H | H |

FIG. 13

| G | R | H | G | R | H | G | R | H |
|----|----|----|----|----|----|----|----|----|
| B | G | H | B | G | H | B | G | H |
| G | R | H | G | R | H | G | R | H |
| B | G | H | B | G | H | B | G | H |
| G | R | H | G | R | H | G | R | H |
| B | G | H | B | G | H | B | G | H |
| G | R | H | G | R | H | G | R | H |
| B | G | H | B | G | H | B | G | H |

FIG. 14

APPARATUS AND METHOD FOR INPUTTING REFLECTED LIGHT IMAGE OF A TARGET OBJECT

CROSS REFERENCE TO RELATED APPLICATIONS

This application is a divisional application of Ser. No. 09/268,645 filed Mar. 16, 1999, and claims priority to the Japanese Application No. 10-066382, filed on Mar. 17, 1998, the entire contents of which being incorporated herein by reference.

BACKGROUND OF THE INVENTION

This application is based on Japanese Patent Application No. 10-66382, filed Mar. 17, 1998, the contents of which are incorporated herein by reference.

The present invention relates to an information input apparatus and method for inputting information in a three-dimensional space, and to a recording medium.

As an input device to a computer, a mouse is prevalently used. However, the mouse is used to merely attain roles of a two-dimensional pointing device such as movement of the cursor, selection of a menu, and the like. Since information the mouse can process in two-dimensional information, the mouse can hardly select, e.g., an object with a depth in a three-dimensional space. On the other hand, when the mouse is used to animate a character upon creating an animation, it cannot easily naturally animate the character. In order to compensate for such difficulties in pointing in a three-dimensional space, three-dimensional pointing devices have been developed. For example, a three-dimensional pointing device 150 shown in FIG. 1 allows six ways of operations, i.e., pushing a central round portion forward, pressing the center of that portion, pressing the rear end of that portion, lifting the entire portion upward, turning the entire portion clockwise, and turning the entire portion counterclockwise, and has six degrees of freedom. By assigning these six degrees of freedom to various instructions, the position (x, y, z) and directions (x-, y-, and z-axes) of a cursor in three-dimensional space can be controlled, or the view point position (x, y, z) and directions (x-, y-, and z-axes) with respect to the three-dimensional space can be controlled.

However, when this device is operated actually, the cursor or view point cannot be desirably controlled. For example, when the operator wants to turn the round portion clockwise or counterclockwise, he or she may press its forward or rear end, and the cursor or view point may move in an unexpected direction.

In place of such three-dimensional pointing device, devices that can input instructions using hand or body actions have been developed. Such devices are called, e.g., a data glove, data suit, cyber glove, and the like. For example, the data glove is a glove-like device, and optical fibers run on its surface. Each optical fiber runs to a joint of each finger, and upon bending the finger, the transmission state of light changes. By measuring the transmission state of light, the bent level of the joint of each finger can be detected. The position of the hand itself in the three-dimensional space is measured by a magnetic sensor attached to the back of the hand. If an action is assigned to a given instruction (e.g., if the index finger is pointed up, a forward movement instruction is issued), the operator can walk in the three-dimensional space by variously changing the view point using the data glove (walkthrough).

However, some problems must be solved. Such device is expensive, and can hardly be used for home use. Since the angle of the finger joint is measured, even when, for example, stretching only the index finger and bending other fingers is defined as a forward movement instruction, stretching a finger includes various states. That is, since the second joint of the index finger rarely makes 180°, it is different to recognize the stretched state except for such 180° state of the index finger, unless a given margin is assured. Since the operator must wear the data glove, his or her natural movement is disturbed. Every time the operator wears the data glove, he or she must calibrate the transmission state of light in correspondence with the stretched and bent finger states, resulting in troublesome operations. Since optical fibers are used, failures such as disconnection of fibers may take place after continuous use of the data glove, and the data glove has a durability as low as an expendable. Despite the fact the data glove is such expensive, troublesome device, if the glove size does not just fit with the operator's hand, the input value may deviate from the calibrated value during use due to slippage of the glove, and delicate hand actions can hardly be recognized. Owing to various problems described above, the data glove has not so prevailed contrary to initial expectation although it served as a trigger device of the VR (virtual reality) technology. For this reason, the data glove is still expensive, and has many problems in terms of its use.

By contrast, some studies have been made to input hand and body actions without wearing any special devices such as a data glove. For example, a method of recognizing hand shape by analyzing a moving image such as a video image has been studied.

However, with such method, it is very hard to extract an objective image portion (e.g., in case of hand action recognition, a hand image alone) from the background image. For example, assume that an objective image is extracted using colors. Since the hand has skin color, only a skin color portion may be extracted. However, if a beige clothing article or wall is present as a background, it is hard to recognize skin color. Even when beige is distinguished from skin color by adjustment, if illumination changes, the color tone also changes. Hence, it is difficult to steadily extract a skin color portion.

In order to avoid such problems, a method that facilitates extraction by imposing a constraint on the background image, e.g., by placing a blue mat on the background may be used. Alternatively, a method that colors finger tips to easily extract them from the background or makes the operator wear color rings may be used. However, such constraints are not practical; they are used for experimental purposes but are not put into practical applications.

The above-mentioned video image recognition such as extraction and the like requires a very large computation amount. For this reason, existing personal computers cannot process all video images (as large as 30 images per sec) in real time. Hence, it is hard to attain motion capture by video image processing in real time.

A device called a range finder for inputting a distant image is known. The typical principle of the range finder is to irradiate an object with spot light or slit light and obtain a distant image based on the position where the light reflected by the object is received by the principle of triangulation. The range finder mechanically scans spot light or slit light to obtain two-dimensional distance information. This device can generate a distant image with very high precision, but requires a large-scale arrangement, resulting in high cost. Also, a long input time is required, and it is difficult for this device to process information in real time.

A device for detecting a color marker or light-emitting unit attached to a hand or body portion from an image, and capturing the shape, motion, and the like of the hand or body portion may be used, and has already been put into some applications. However, the device has a serious demerit of user's inconvenience, since the user must wear the device upon every operation, and the application range is limited very much. As in the example of the data glove, when the user wears the device on his or her movable portion such as a hand, the durability problem is often posed.

The problems in a conventional camera technique will be explained below in addition to the aforementioned input devices. With the conventional camera technique, in order to synthesize (chromakey) a character with a background, a character image must be photographed in front of a blue back to facilitate character extraction. For this reason, the photographing place is limited to, e.g., a studio that can photograph an image in front of a blue back. Alternatively, in order to extract a character from an image photographed in a non-blue back state, the character extraction range must be manually edited in units of frames, resulting in very cumbersome operations.

Similarly, in order to generate a character in a three-dimensional space, a three-dimensional model is created in advance, and a photograph of the character is pasted to the model (texture mapping). However, creation of a three-dimensional model and texture mapping are tedious operations and are rarely used other than applications such as movie production that justifies extravagant cost needed.

In order to solve these problems, for example, a technique disclosed in U.S. Ser. No. 08/953,667 (now U.S. Pat. No. 6,144,366) is known. This technique acquires a distant image by extracting a reflected light image. However, this technique cannot obtain hue information of an object since it extracts the reflected light image. For this reason, two different types of cameras, i.e., a conventional imaging camera and a camera for extracting a reflected light image, are required.

BRIEF SUMMARY OF THE INVENTION

It is an object of the present invention to provide an information input apparatus and method that can acquire a reflected light image using a versatile image sensor, and a recording medium.

It is another object of the present invention to provide an information input apparatus and method which can attain high-level image processing such as extraction of an object image alone from the background in a normal image, and the like, and a recording medium.

In order to achieve the above objects, according to the first aspect of the present invention, an information input apparatus comprises: a light emitter for irradiating an object with light; an area image sensor for outputting a difference between charges received by light-receiving cells arranged in an array pattern from a reflected light of the object caused by the light emitter irradiating the object with light; a timing signal generator for generating a timing signal comprised of a pulse signal or a modulation signal for controlling an intensity of light of the light emitter; a control signal generator for generating a control signal for individually controlling light-receiving timings of the light-receiving cells of the area image sensor on the basis of the timing signal from the timing signal generator; and image processing section for extracting a reflected light image of the object from the difference outputted from the area image sensor.

According to the second aspect of the present invention, an information input apparatus comprises: a timing signal generator for generating a timing signal comprised of a pulse signal or a modulation signal; a light emitter for emitting light, an intensity of which changes on the basis of the timing signal from the timing signal generator; first light-receiving section for receiving light emitted by the light emitter and reflected by an object in synchronism with the timing signal from the timing signal generator; and second light-receiving section for receiving light other than the light emitted by the light emitter and reflected by the object.

According to the third aspect of the present invention, an information input method comprises the steps of: generating a pulse signal or a modulation signal; generating, on the basis of the pulse or modulation signal, a control signal for separately controlling light-receiving timings of light-receiving cells of an area image sensor for obtaining a difference between charges received by light-receiving cells which are arranged in an array pattern; emitting light, an intensity of which changes on the basis of the generated control signal; and detecting a light image reflected by an object of the emitted light.

According to the fourth aspect of the present invention, an information input method comprises the steps of: generating a pulse signal or modulation signal; emitting light, an intensity of which changes on the basis of the pulse or modulation signal; and receiving light reflected by an object of the emitted light and light other than the reflected light in synchronism with the pulse or modulation signal.

According to the fifth aspect of the present invention, an article of manufacture comprises: a computer usable medium having computer readable program code means embodied therein for causing an area image sensor for obtaining a difference between charges received by light-receiving cells which are arranged in an array pattern to be controlled, the computer readable program code means in the article of manufacture comprising: computer readable program code means for causing a computer to generate a pulse signal or a modulation signal; computer readable program code means for causing a computer to generate a control signal for separately controlling light-receiving timings of the light-receiving cells of the area image sensor on the basis of the pulse or modulation signal; computer readable program code means for causing a computer to cause a light emitter to emit light, an intensity of which changes on the basis of the generated pulse signal or modulation signal; and computer readable program code means for causing a computer to extract a light image reflected by an object of the emitted light from the difference outputted from the area image sensor.

According to the present invention, since a reflected light image can be acquired using a versatile image sensor, i.e., the versatile image sensor can be used, a cost reduction of the apparatus can be realized.

According to the present invention, high-level image processing such as extraction of an object image alone from the background in a normal image, and the like can be easily implemented.

Furthermore, according to the present invention, a reflected image and an image based on other light components can be simultaneously obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 shows an example of the filter arrangement on an image sensor of the apparatus that can simultaneously acquire an image based on object reflected light and an image based on other light components;

FIG. 10 shows an example of the filter arrangement on an image sensor of the apparatus that can simultaneously acquire an image based on object reflected light and an image based on other light components;

FIG. 13 shows an example of the filter arrangement on an image sensor of the apparatus that can simultaneously acquire an image based on object reflected light and an image based on other light components; and FIG. 14 shows an example of the filter arrangement on an image sensor of the apparatus that can simultaneously acquire an image based on object reflected light and an image based on other light components.

DETAILED DESCRIPTION OF THE INVENTION

The preferred embodiments of the present invention will be explained hereinafter with the aid of the accompanying drawings.

Figure 1:
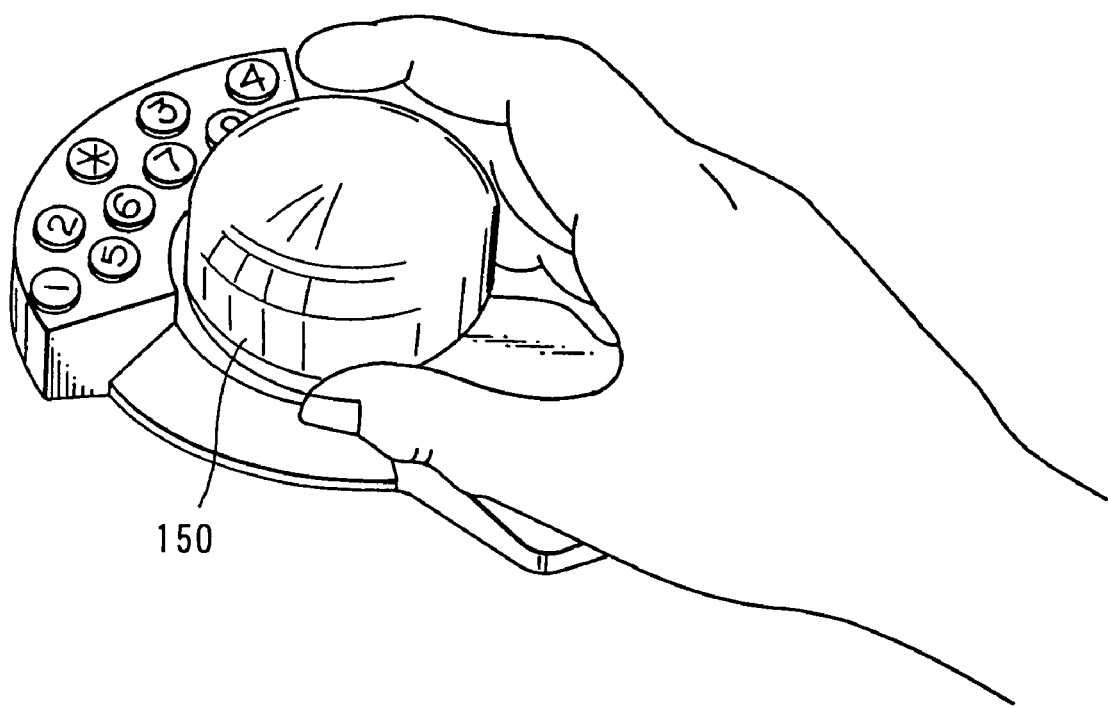
FIG. 1 is a perspective view showing an example of a conventional three-dimensional data input device.
Figure 2:
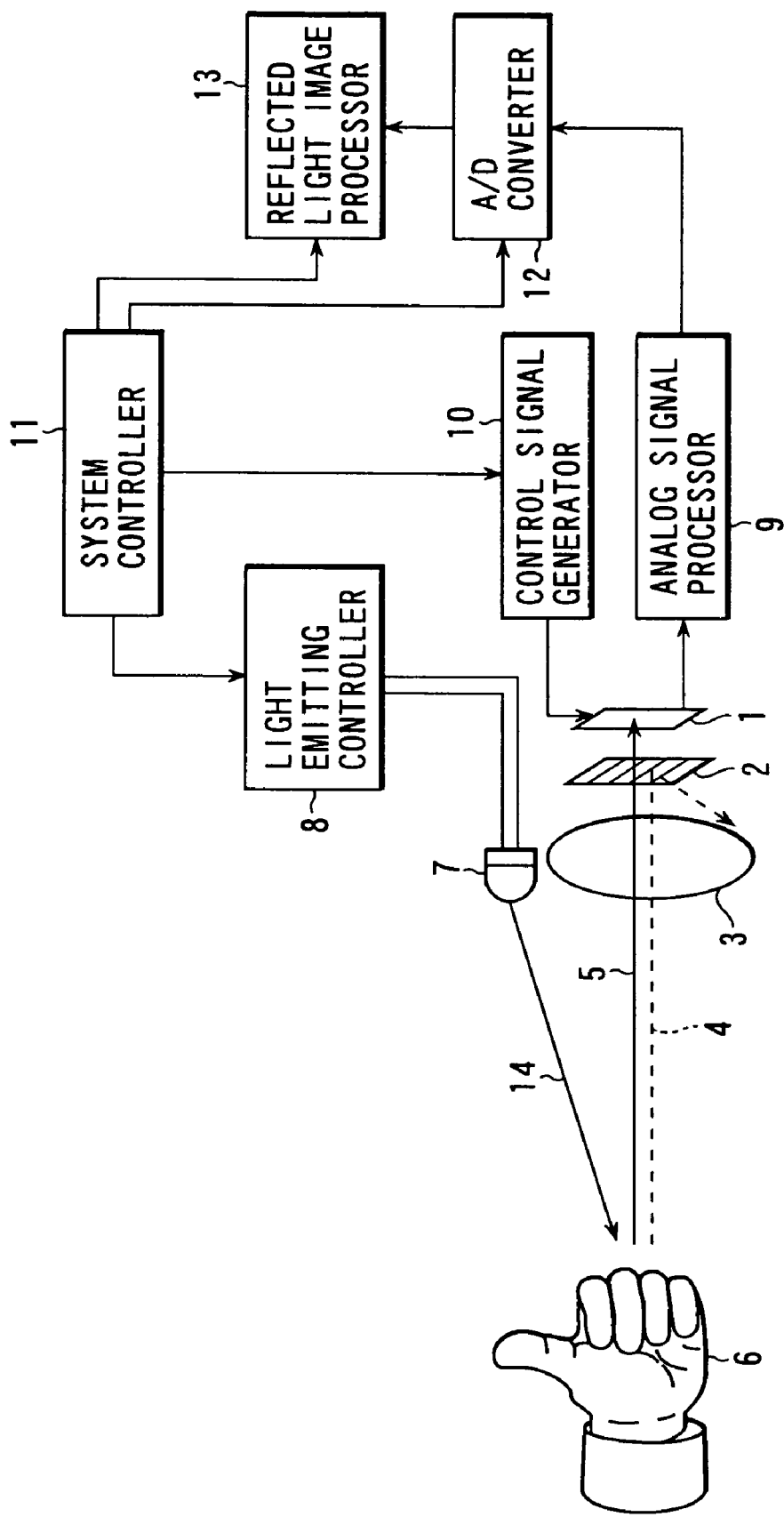
FIG. 2 is a block diagram showing an example of the arrangement for acquiring a reflected light image using an image sensor.

FIG. 2 shows an example of the arrangement of an apparatus for acquiring a reflected light image using an image sensor. A light emitting controller 8 controls a light source 7 to emit light in a predetermined light emitting pattern on the basis of a timing signal comprised of a pulse signal or modulation signal generated by a system controller 11. More specifically, the light source emits one-shot pulse light per frame. The wavelength of light is not particularly limited, but a light source that emits light such as near infrared light which is contained in external light (illumination light, sunlight), has low power, and does not glare, is preferably used.

The light source 7 preferably comprises, e.g., an LED which stably operates for a long period of time, and responds at high speed. A light-receiving sensor 1 operates to sense at least twice in synchronism with the light emitted by the light source 7. The sensor 1 operates simultaneously with light emission to receive light containing object reflected light 5 of light 14 emitted by the light source. The sensor 1 also operates when the light source ceases to emit any light, so as to receive light that does not contain any object reflected light of the light emitted by the light source. This sensor can output the difference between these two imaging results. That is, by obtaining this difference, the object reflected light alone of the light emitted by the light source is output. An intensity of the light emitted by the light source is controlled based on the timing signal.

A control signal generator 10 generates control signals for controlling light reception of individual light-receiving cells of the light-receiving sensor 1 on the basis of the pulse or modulation signal generated by the system controller 11, and supplies these signals to the light-receiving sensor 1.

A filter 2 that intercepts unwanted light is inserted between a lens 3 and the sensor 1. For example, an optical bandpass filter that passes only the light source wavelength is inserted. For this reason, most of unwanted light components 4 such as illumination light do not become incident on the sensor. However, since external light such as illumination light or the like normally has light components having the same wavelength as the light source wavelength, the difference is output.

The sensor output is converted into digital data by an A/D converter 12 via an analog signal processor 9. A reflected light image processor 13 performs various kinds of processing using the digital image data. Upon interpreting the operator's hand action, the processor 13 extracts a two- or three-dimensional hand shape, and estimates an action of the hand 6. A detailed description of the processing in this reflected light image processor 13 will be omitted in this embodiment.

Figure 3:
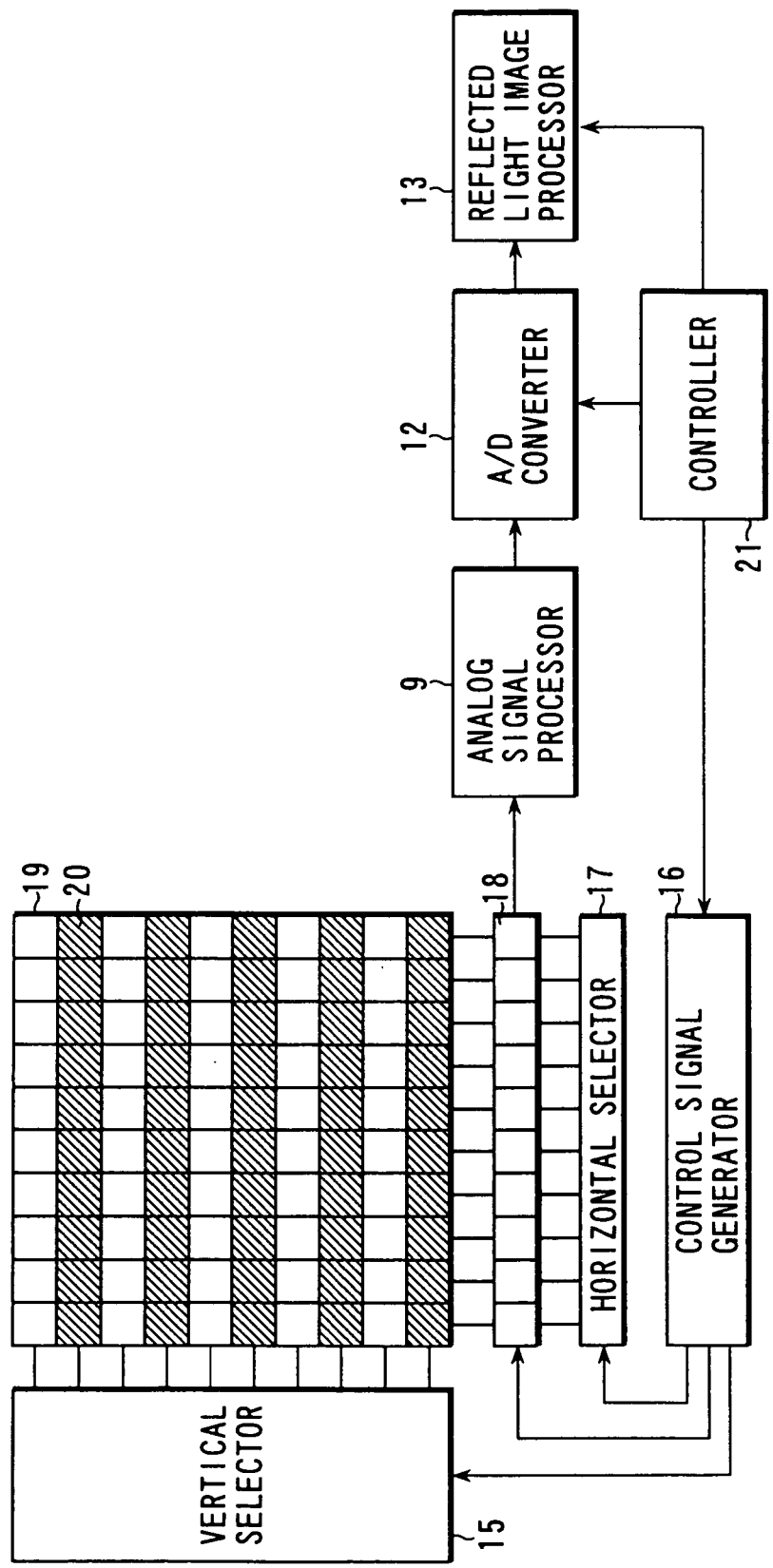
FIG. 3 is a block diagram showing an example of the arrangement for acquiring a reflected light image using an image sensor in more detail.

FIG. 3 shows an image sensor in the light-receiving sensor unit shown in FIG. 2 in more detail. The image sensor shown in FIG. 2 can designate pixel position by a vertical selector 15 and horizontal selector 17 and can extract an output stored in the designated cell.

A difference circuit 18 can temporarily store a charge amount and can output the difference between the stored charge amount and the next input charge amount. In this image sensor, imaging operations of even and odd lines can be separately controlled. The even lines are used as cells that receive light when the light source emits light, and the odd lines are used as cells that receive light when the light source ceases to emit light. More specifically, the cells in the even lines sense when the light source emits light, and the cells in the odd lines sense when the light source ceases to emit light. The former cells will be referred to as emission-timing storage cells 20, and the latter cells will be referred to as non-emission-timing storage cells 19 hereinafter.

The control signal generator 16 generates control signals for controlling the vertical selector 15, the difference circuit 18 and the horizontal section 17. A controller 21 generates control signals to control the signal generator 16, the A/D converter 12 and the reflected light image processor 13.

For example, the difference circuit 18 operates as follows. The difference circuit 18 reads out contents of non-emission-timing storage cells in the first line, and stores them for one line. Then, the difference circuit 18 reads out the contents of non-emission-timing storage cells in the second line, and outputs the difference between the currently readout amount and the stored received-light amount for the first line. The subsequent processing is the same as that in FIG. 2.

Figure 4:
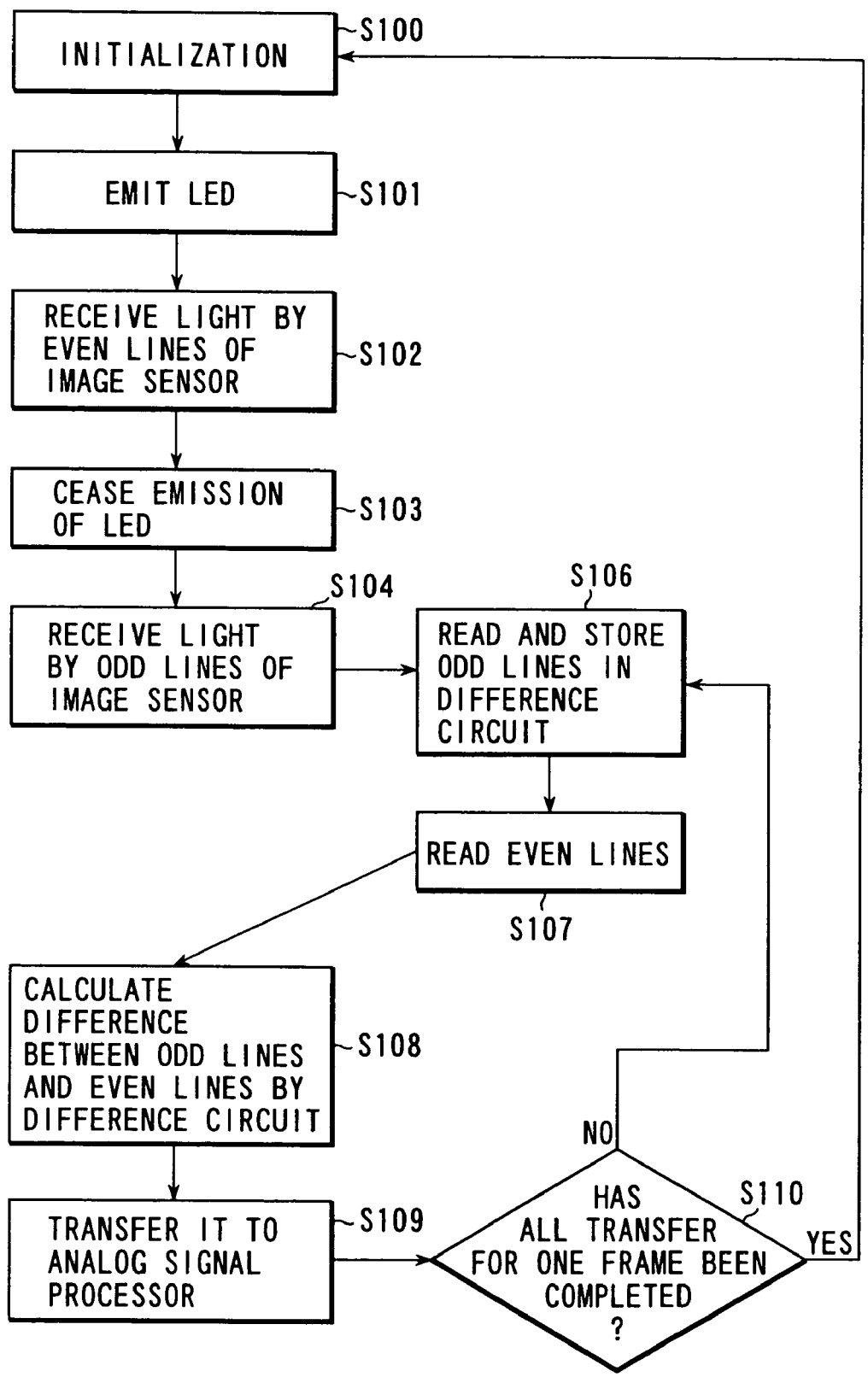
FIG. 4 is a flow chart showing the operation for acquiring a reflected light image using an image sensor.

FIG. 4 is a flow chart showing the processing in the arrangement shown in FIG. 3. First, initialization is made (S100). When the LED emits light (step S101), the even lines receive light (step S102); when the LED ceases to emit light (step S103), the odd lines receive light (step S104). In this way, as shown in FIG. 3, charges received while light is emitted are stored in the even lines, and those received while light is not emitted are stored in the odd lines. These charges are read out via the difference circuit 18.

Initially, the received-light level of one odd line, i.e., at a non-emission timing is stored in the difference circuit (step S106). Then, the received-light level of one even line, i.e., at an emission timing are read out to the difference circuit 18 (step S107), and only the difference between the levels at the emission and non-emission timings is output (step S108). The difference is input to the analog signal processor 9 (step S109).

Such operation continues until the contents of all the lines are transferred in the vertical direction S110. Upon completion of transfer, operation for emitting and receiving light is repeated.

Figure 5:
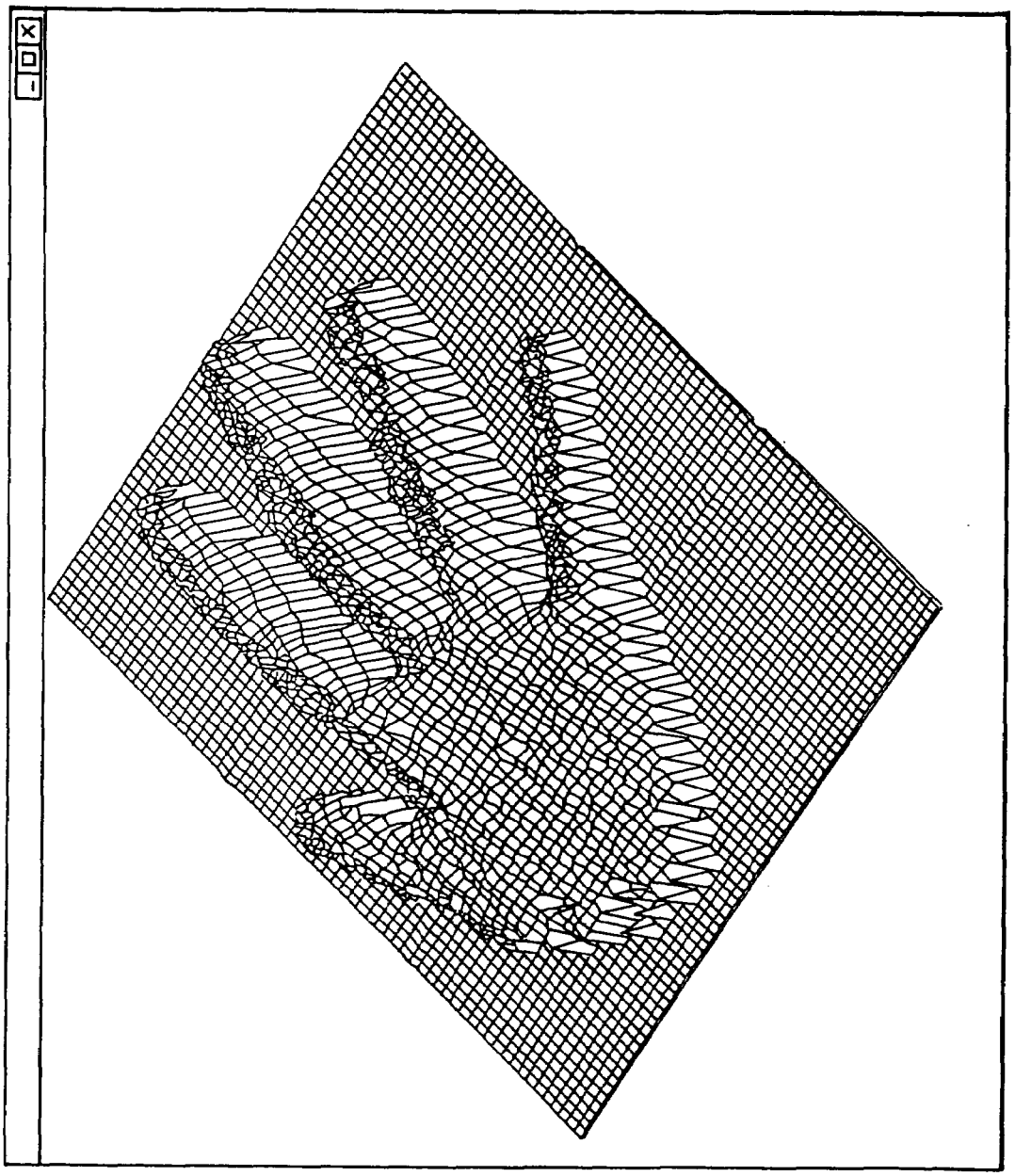
FIG. 5 shows an example of the acquired reflected light image.

With the above-mentioned operation, for example, a reflected light image (a three-dimensional image in practice since the intensity of reflected light is inversely proportional to the square of distance) shown in FIG. 5 is acquired.

In FIG. 3, the apparatus for acquiring an object reflected light image of a light source using an image sensor has been described. However, there are requirements for an apparatus that can simultaneously obtain a reflected light image from which the object shape can be easily acquired, and an image taken by a normal camera (to be referred to as a visible light image hereinafter). If such apparatus is realized, a human body or face alone can be easily extracted from the visible light image.

Figure 6:
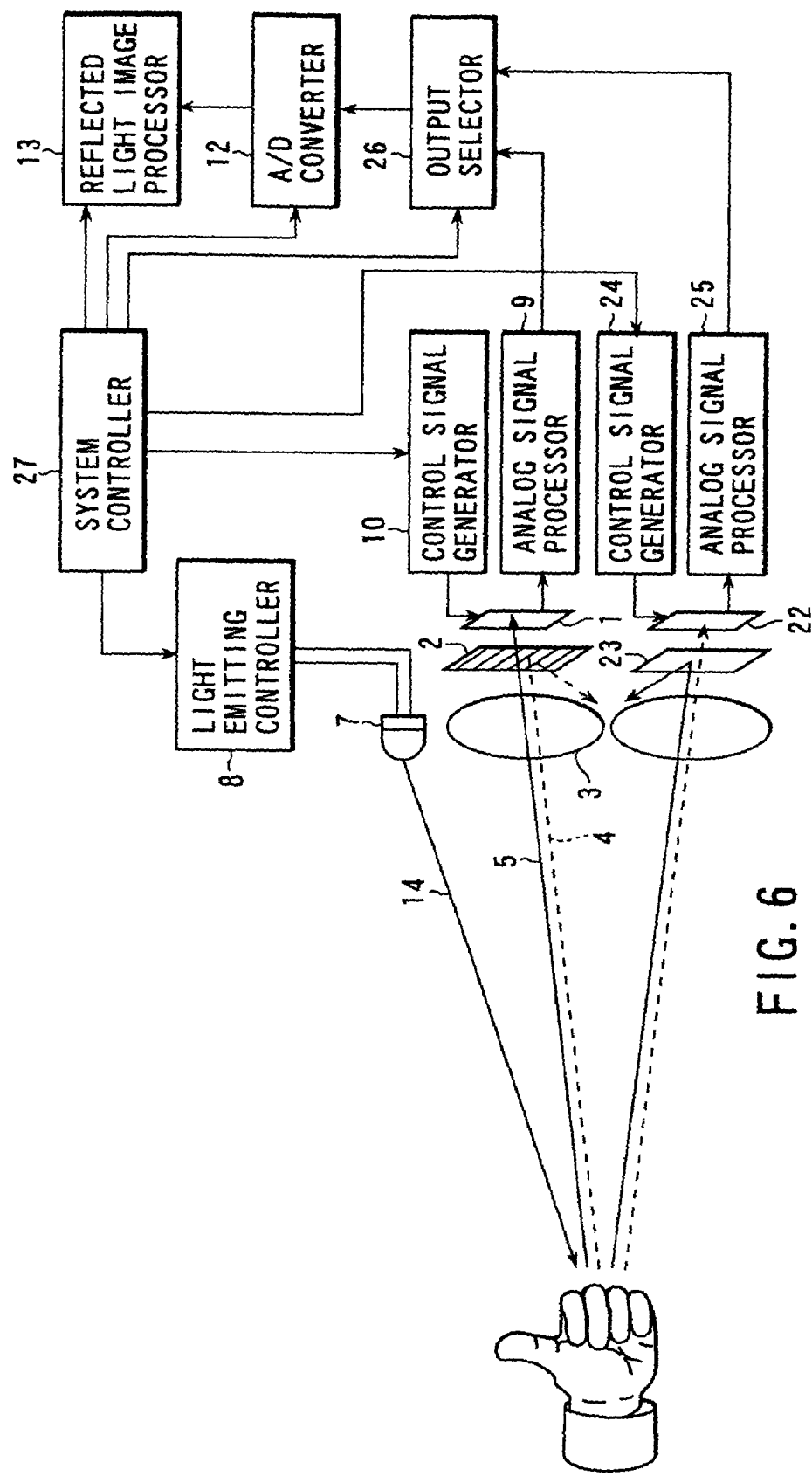
FIG. 6 is a block diagram showing an example of the arrangement of an apparatus that can simultaneously acquire an image based on object reflected light and an image based on other light components.

FIG. 6 shows an example of the arrangement of an apparatus which can simultaneously obtain a reflected light image and visible light image. In this embodiment, two different types of image sensors are prepared in correspondence with the reflected light image and visible light image.

A light-receiving sensor 1 for the reflected light image has the arrangement described above with the aid of FIG. 3. An optical bandpass filter 2 that passes only the wavelength light of a light source is placed in front of the image sensor 1. This filter passes only object reflected light 5 of the light source, and reflects other light components such as illumination light and its object reflected light 4.

On the other hand, a sensor 22 for the visible light image can use a CCD image sensor, CMOS image sensor, and the like, which are used in a normal imaging camera. An optical filter 23 that reflects object reflected light from the light source is normally placed in front of the sensor for the visible light image. However, when the object reflected light of the light source does not influence largely, e.g., when an infrared light cut filter used in an imaging camera suffices or when the sensor for the visible light image has low sensitivity to the light source due to its spectral sensitivity characteristics, this optical filter may be omitted.

When these two sensors simultaneously operate, higher-level information such as an extracted object can be obtained.

Also, this apparatus can be used for simply obtaining a reflected light image or visible light image alone.

In this arrangement, since the sensor for the reflected light image is placed in the vicinity of the sensor for the visible light image, images nearly free from position errors can be obtained. However, strictly speaking, slight position errors are present, and they become conspicuous if the object is close to the apparatus.

A control signal generator 24 generates a control signal for controlling the sensor 22 for the visible light image. An analog signal processor 25 processes a reflective image signal and color image signal. A system controller 27 controls the whole system.

Figure 7:
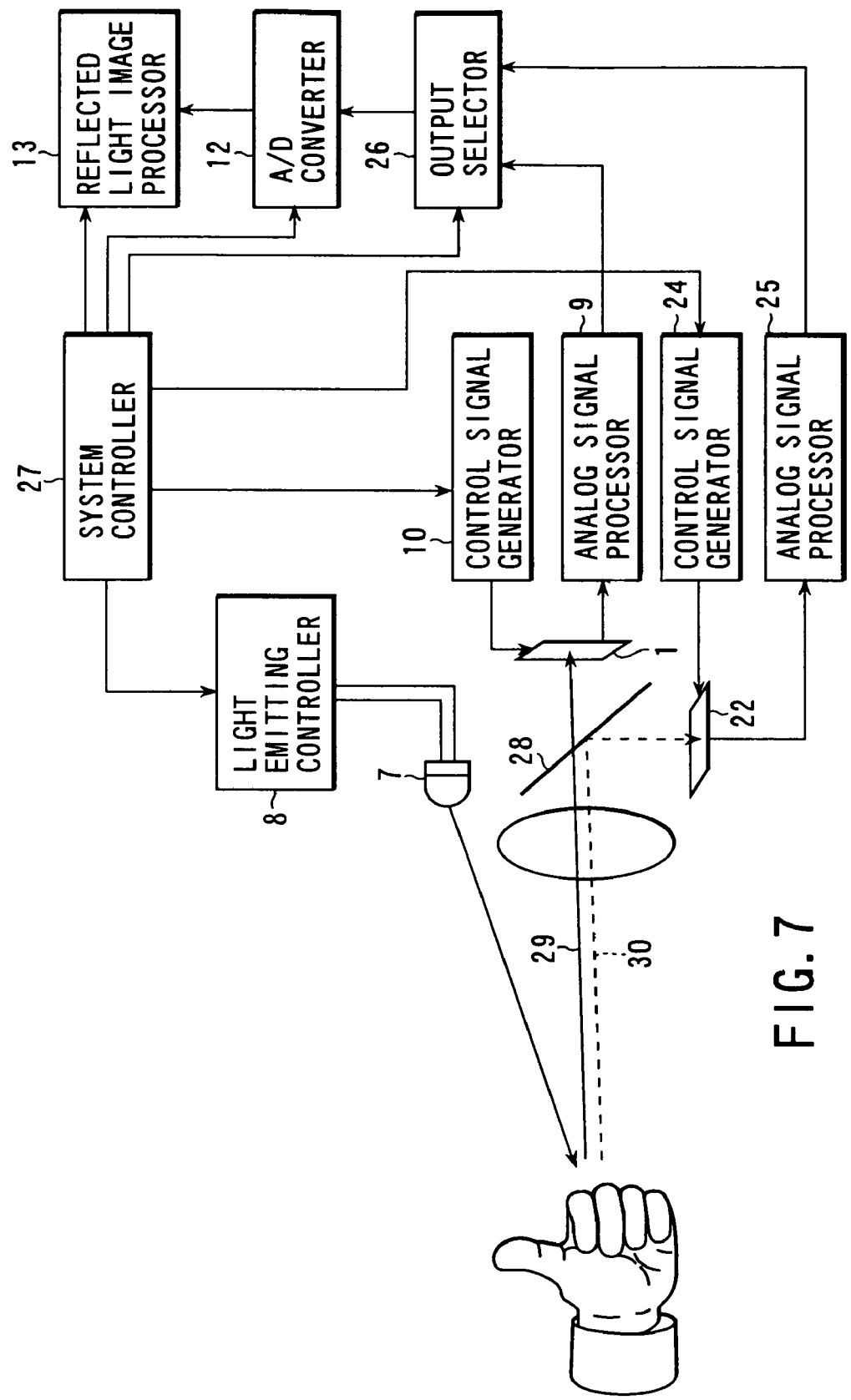
FIG. 7 is a block diagram showing an example of the arrangement of an apparatus that can simultaneously acquire an image based on object reflected light and an image based on other light components.

FIG. 7 shows an example of the arrangement that can prevent such position errors. In this arrangement, an optical system is shared by the reflected light image and visible light image. Light that has passed through the optical system is split into object reflected light 29 of the light source and other light components 30 by, e.g., a dichroic mirror 28. The dichroic mirror passes light in a specific wavelength range, and reflects other light components. The arrangement shown in FIG. 7 uses a mirror that passes the wavelength light of the object reflected light, and reflects other light components. With this arrangement, two images having optical axes which accurately match, i.e., a reflected light image and visible light image, can be obtained.

In this example, a dichroic mirror is used. However, the present invention is not limited to such specific device but can use any other devices which can split light into the object reflected light of the light source and other light components, and can input them to two image sensors placed at positions where they do not overlap each other.

Figure 8:
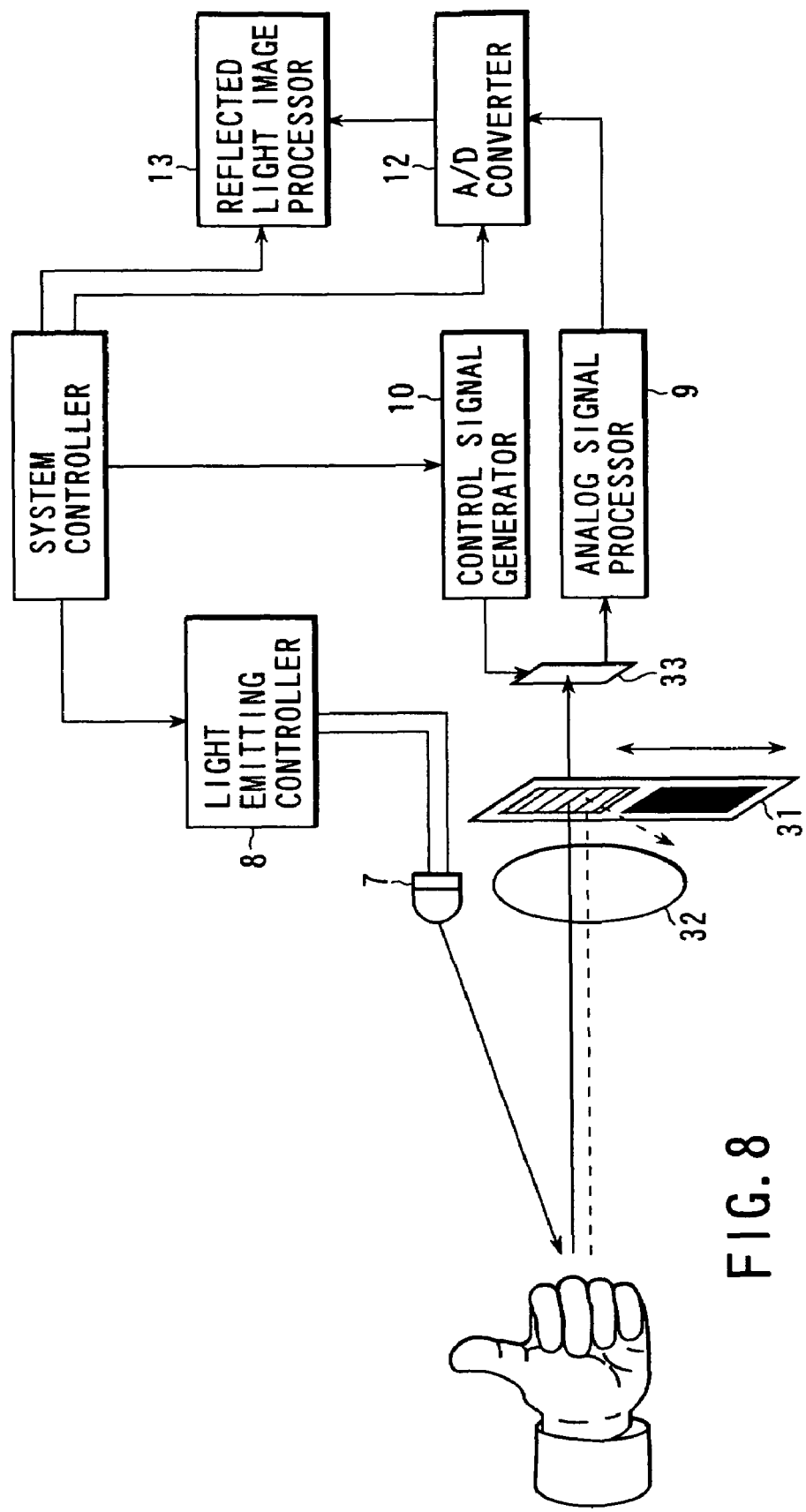
FIG. 8 is a block diagram showing an example of the arrangement of an apparatus that can simultaneously acquire an image based on object reflected light and an image based on other light components.

In FIGS. 6 and 7, the two sensors respectively for the reflected light image and visible light image are used. If such processing can be done using a single sensor, further cost reduction can be attained. FIG. 8 shows one example of such arrangement. A slidable optical filter 31 is inserted between a lens 32 and sensor 33.

This filter has a bandpass filter that passes only the wavelength light of the light source on its half portion, and has an optical filter that intercepts this wavelength light and passes visible light on the other half portion. By sliding this filter, light that reaches the sensor can be limited to only the object reflected light of the light source or visible light. In this case, a single image sensor must sense both a reflected light image and visible light image. Such sensor will be described below.

FIG. 9 shows a color filter matrix normally used in a CMOS image sensor. As shown in FIG. 9, this matrix includes "R" cells that pass red components, "G" cells that pass green components, and "B" cells that pass blue components. When a visible light image is to be sensed, the outputs from these cells are directly output. During this period, the difference circuit ceases to operate or is used only for removing fixed pattern noise. The fixed pattern noise is the one that has fixed values in units of cells.

In order to obtain a reflected light image, the sensor operation is switched. For example, only "G" cells are used. In this case, a G1 cell stores a non-emission-timing charge, a G2 cell stores an emission-timing charge, and their difference can be output using the difference circuit. For this purpose, imaging control of G cells must be done using two systems to separately sense images.

For example, a group of cells G1, G3, G5, and G7, and a group of cells G2, G4, G6, and G8 can separately sense images. In this case, the visible light image and reflected light image have different image resolutions. In case of the visible light image, since four pixels (two G pixels and one each R and B pixels) form one color pixel, the matrix shown in FIG. 9 includes 4×4 pixels. When the differences between G1 and G2 and between G3 and G4 are calculated, and are added to each other, i.e., when G1 through G4 form one pixel of the reflected light image, the resolution is halved in the vertical direction, and remains the same in the horizontal direction. When G1 through G8 form one pixel of the reflected light image, the resolution is halved in both the vertical and horizontal directions (2×2 in FIG. 9).

In the above example, the reflected light image is obtained using "G" cells alone. However, when the three types of cells, i.e., R, G, and B cells have nearly the same spectral sensitivities to the light source wavelength, one pixel of the reflected light image can be formed using these four pixels. For example, G1 and R1 cells store non-emission-timing charges, and B1 and G3 cells store emission-timing charges. Then, the differences between B1 and G1, and between G3 and R1 are added to each other, thus obtaining a reflected light image having the same resolution as that of the visible light image. Furthermore, if the difference between B1 and G1 or between G3 and R1 is considered as one pixel, the horizontal direction can be doubled with respect to the visible light image.

Even when "G" cells only can be used to form a reflected light image, a reflected light image having the same resolution as that of the visible light image can be obtained. If a filter matrix shown in FIG. 10 is used, and if G1 stores a non-emission-timing charge and G2 stores an emission-timing charge, their difference can be output. Since the difference circuit is normally designed to calculate the difference between pixels in an identical line, when the filter matrix shown in FIG. 9 is used, it is difficult to output the difference between G1 and G3, but it is easy to output the difference between G1 and G2 in FIG. 10.

Since the above-mentioned control for obtaining a reflected light image is different from that for obtaining a visible light image, the sensor control must be switched. The control may be explicitly switched by a hardware switch or a software switch (when this apparatus is connected to a personal computer and is used). Alternatively, a mechanism for turning on/off the switch upon sliding the filter may be provided, and the current position of the filter may be automatically recognized to switch the control.

In case of the arrangement shown in FIG. 8, it is easy to separately obtain a reflected light image and visible light image but it is difficult to simultaneously obtain them. However, these images can be simultaneously obtained when a mechanism for moving the optical filter at high speed is added. Also, a method of rotating a circular filter having semi-circular filter elements is available.

Figure 11:
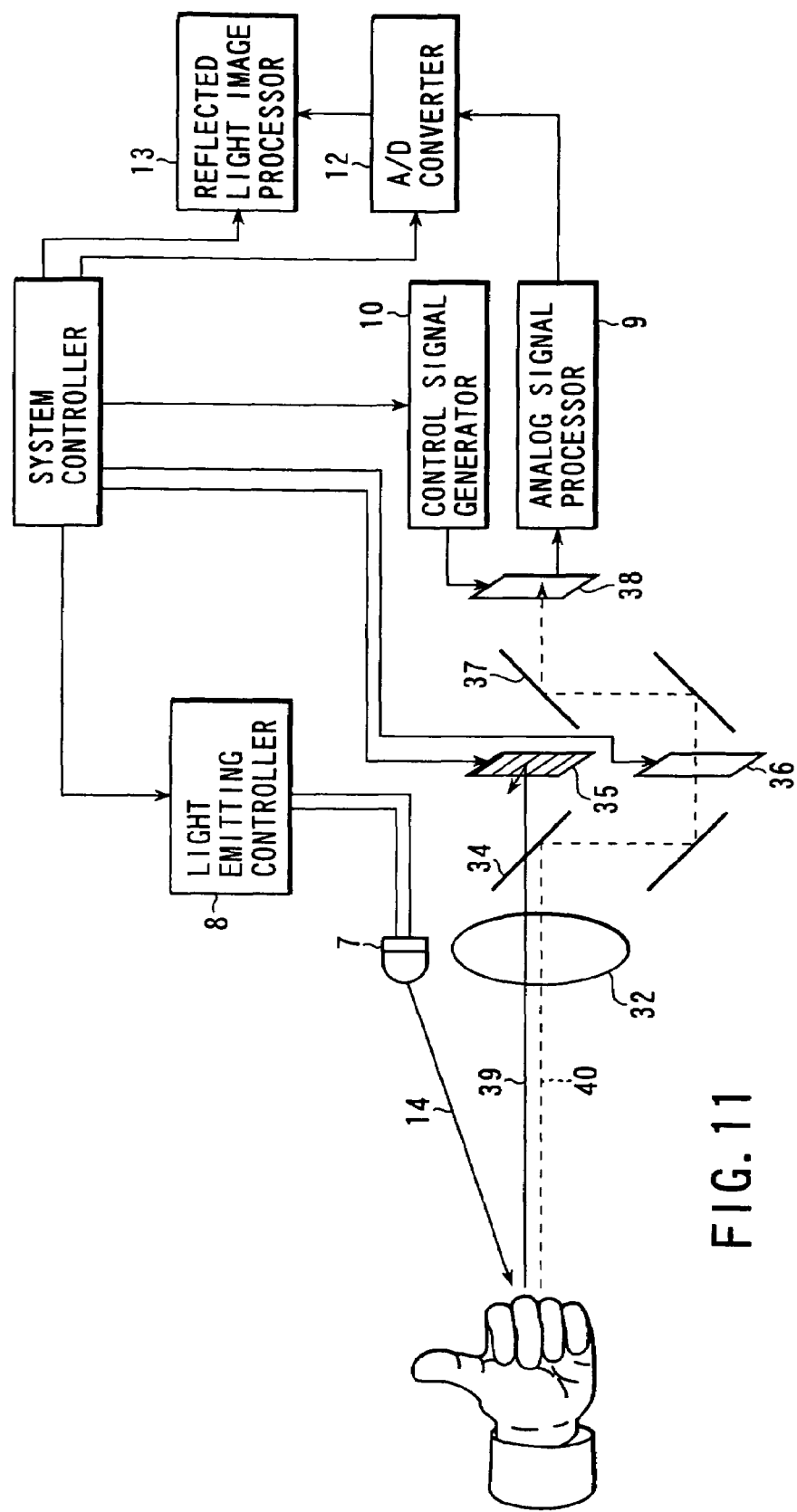
FIG. 11 is a block diagram showing an example of the arrangement of an apparatus that can simultaneously acquire an image based on object reflected light and an image based on other light components.

FIG. 11 shows another example of the arrangement that can simultaneously sense a reflected light image and visible light image using a single sensor. Using a light ray splitting means 34 such as a dichroic mirror or the like, which is similar to that used in FIG. 7, light is split into object light of the light source and other light components. Shutter means 35 and 36 which can selectively pass or intercept these light components are provided. The light components that have passed through the shutter means are synthesized, and the synthesized light is guided to an optical sensor 38 near-infrared light and reflected light are synthesized with a light ray splitting means 37.

The shutter means can use liquid crystal panels or the like. Since liquid crystal panels or the like can be non-mechanically driven, reliability can be improved as compared to a mechanical structure.

In FIG. 11, object reflected light 39 of the light source is intercepted, and other light components 40 can pass through the shutter. In the other state, the object reflected light reaches the sensor, but visible light is intercepted by the shutter.

Figure 12:
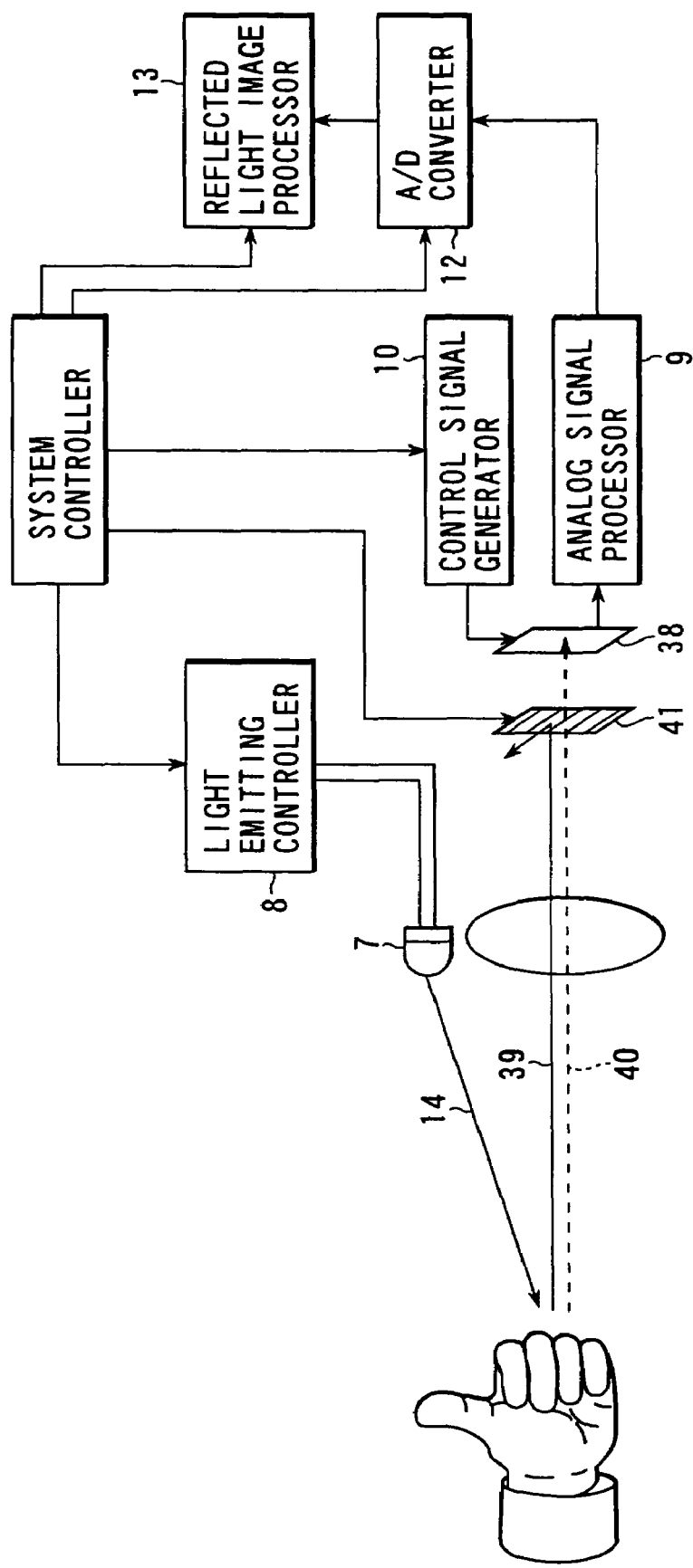
FIG. 12 is a block diagram showing an example of the arrangement of an apparatus that can simultaneously acquire an image based on object reflected light and an image based on other light components.

In FIG. 11, two split light beams are synthesized again via the corresponding shutter means. If an element, the filter characteristics of which can be dynamically changed, is used, the optical path need not be split. In an arrangement shown in FIG. 12, an element 41 which can be switched between two states:

(1) only the light source wavelength is passed; and (2) only visible light is passed is inserted between the lens and sensor. By only switching the element state, two different types of images can be sensed. In FIG. 12, object reflected light 39 of the light source is intercepted, and other light components 40 can pass through the element. In the other state, the object reflected light reaches the sensor, but visible light is intercepted by the shutter.

If an element which can be switched between two states:

(1) only the light source wavelength is passed; and (2) all light components are passed and an element which can be switched between two states:

(1) only visible light is passed; and (2) all light components are passed are available, the same arrangement can be realized by superposing these elements.

When the color filter of the sensor has a special arrangement, both a reflected light image and visible light image can be obtained by a single sensor. FIG. 10 shows an example of the normal color filter matrix. However, when a matrix shown in FIG. 13 is used, cells can be classified into those for a reflected light image, and those for a visible light image. In FIG. 13, cells indicated by "H" have filters for passing only the wavelength of the light source. R, G, and B cells are used for sensing a visible light image, and H cells are used for sensing a reflected light image.

For example, H1 and H3 cells store non-emission-timing charges, and H2 and H4 cells store emission-timing charges. When H1 to H4 cells form one pixel of the reflected light image, the obtained reflected light image can have the same resolution as that of the visible light image. In a normal imaging camera, a filter for cutting infrared light components is used. When near infrared light is used as the light source, the light source emits light with higher intensity or infrared cut filters are attached onto only cells for the visible light image.

FIG. 14 shows another example of the filter matrix. As compared to FIG. 13, the vertical resolution is doubled, and the horizontal resolution is reduced to ⅔. If an image with higher resolution is required, this matrix is preferably used.

The present invention described above can be improved by software processing using a versatile processor without using any dedicated hardware. For example, the processing shown in FIG. 4 can be implemented using a computer program, and when the computer program is installed in and executed by a computer via a recording medium such as a floppy disk, CD-ROM, or the like, the present invention can be practiced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An information input method comprising:
   irradiating an object with light;
   picking up, using an image sensor, at an emission time, picking up at a non-emission time, and picking up a visible light image;
   generating a timing signal comprised of a pulse signal or a modulation signal for controlling an intensity of light of a light emitter;
   generating a control signal for individually controlling light-receiving timings of light-receiving cells of with image sensor on the basis of the timing signal from a timing signal generator;
   detecting a difference in accumulated electrical charges between a cell of first cells and a corresponding cell of second cells;
   passing using a filter only light emitted by said light emitter;
   intercepting light emitted by said light emitter; and
   selecting one of pass filter and cut filter upon passing light to be sensed.

2. An information input method, comprising:
   irradiating an object with light;
   picking up, using an image sensor, at an emission time, picking up at a non-emission time, and picking up a visible light image;
   generating a timing signal comprised of a pulse signal or a modulation signal for controlling an intensity of light of a light emitter;
   generating a control signal for individually controlling light-receiving timings of light-receiving cells of with image sensor on the basis of the timing signal from a timing signal generator;
   detecting a difference in accumulated electrical charges between a cell of first cells and a corresponding cell of second cells;
   passing using a filter only light emitted by said light emitter;
   intercepting light emitted by said light emitter; and
   selecting one of pass filter and cut filter in synchronism with the timing signal from said timing signal generator.

3. An information input method, comprising:
   irradiating an object with light;
   picking up, using an image sensor, at an emission time, and picking up at a non-emission time;
   generating a timing signal comprised of a pulse signal or a modulation signal for controlling an intensity of light of a light emitter;
   generating a control signal for individually controlling light-receiving timings of light-receiving cells of with image sensor on the basis of the timing signal from a timing signal generator;
   detecting a difference in accumulated electrical charges between a cell of first cells and a corresponding cell of second cells;
   picking up a visible light image;
   splitting light into the object reflected light and the light other than the object reflected light;
   selecting whether the light is to be passed or intercepted on optical paths of the split light beams; and
   synthesizing the two light beams split by a light splitting section.

4. An information input method, comprising:
   irradiating an object with light;
   picking up, using an image sensor, at an emission time and picking up at a non-emission time;
   generating a timing signal comprised of a pulse signal or a modulation signal for controlling an intensity of light of a light emitter;
   generating a control signal for individually controlling light-receiving timings of light-receiving cells of with image sensor on the basis of the timing signal from a timing signal generator;
   detecting a difference in accumulated electrical charges between a cell of first cells and a corresponding cell of second cells;
   picking up a visible light image;
   splitting light into the object reflected light and the light other than the object reflected light;
   selecting one of a state wherein only a light source wavelength is passed and a state wherein only visible light is passed;
   selecting whether the light is to be passed or intercepted on optical paths of split light beams; and
   synthesizing the two light beams split by a light splitting section.

5. An information input method, comprising:
   irradiating an object with light;
   picking up, using an image sensor, at an emission time and picking up at a non-emission time;
   generating a timing signal comprised of a pulse signal or a modulation signal for controlling an intensity of light of a light emitter;
   generating a control signal for individually controlling light-receiving timings of light-receiving cells of with image sensor on the basis of the timing signal from a timing signal generator;
   detecting a difference in accumulated electrical charges between a cell of first cells and a corresponding cell of second cells;
   picking up a visible light image;
   splitting light into the object reflected light and the light other than the object reflected light;
   selecting one of a state wherein only a light source wavelength is passed and a state wherein all light components are passed;
   selecting one of a state wherein only visible light is passed and a state wherein all light components are passed;
   selecting whether the light is to be passed or intercepted on optical paths of the split light beams; and
   synthesizing the two light beams split by a light splitting section.

* * * * *

UNITED STATES PATENT AND TRADEMARK OFFICE
CERTIFICATE OF CORRECTION

PATENT NO. : 7,453,511 B2  Page 1 of 1
APPLICATION NO. : 10/644754
DATED : November 18, 2008
INVENTOR(S) : Numazaki et al.

It is certified that error appears in the above-identified patent and that said Letters Patent is hereby corrected as shown below:

On the title page, the Terminal Disclaimer information has been omitted. Item (45) and the Notice information should read as follows:

-- (45) **Date of Patent: * Nov. 18, 2008**

(*) Notice: Subject to any disclaimer, the term of this patent is extended or adjusted under 35 U.S.C. 154(b) by 1096 days.

This patent is subject to a terminal disclaimer. --

Signed and Sealed this

Third Day of February, 2009

JOHN DOLL
*Acting Director of the United States Patent and Trademark Office*